(12) United States Patent
McAuliffe et al.

(10) Patent No.: US 9,194,491 B2
(45) Date of Patent: Nov. 24, 2015

(54) MULTI-PART PISTON

(71) Applicants: Christopher McAuliffe, Windsor, CT (US); Peter J. Dowd, Granby, CT (US); John M. Dehais, Jr., Windsor, CT (US)

(72) Inventors: Christopher McAuliffe, Windsor, CT (US); Peter J. Dowd, Granby, CT (US); John M. Dehais, Jr., Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 435 days.

(21) Appl. No.: 13/647,912

(22) Filed: Oct. 9, 2012

(65) Prior Publication Data
US 2014/0096679 A1 Apr. 10, 2014

(51) Int. Cl.
*F16J 1/00* (2006.01)
*F16J 1/12* (2006.01)

(52) U.S. Cl.
CPC ... *F16J 1/008* (2013.01); *F16J 1/12* (2013.01)

(58) Field of Classification Search
CPC ............. F16J 1/001; F16J 1/003; F16J 1/005; F16J 1/006; F16J 1/008; F16J 1/12

USPC ............................................ 92/172, 208, 216
See application file for complete search history.

(56) References Cited

U.S. PATENT DOCUMENTS

| | | | | |
|---|---|---|---|---|
| 1,539,882 A * | 6/1925 | Spencer | | 92/224 |
| 1,938,826 A * | 12/1933 | Frank | | 92/215 |
| 3,108,514 A * | 10/1963 | Gordon | | 92/240 |
| 3,388,915 A * | 6/1968 | Dega | | 277/448 |
| 3,808,956 A * | 5/1974 | Knapp | | 92/172 |
| 3,898,915 A * | 8/1975 | Neuman | | 91/395 |
| 3,994,604 A * | 11/1976 | Visser | | 403/15 |
| 6,223,701 B1 * | 5/2001 | Kruse | | 123/41.35 |
| 8,327,537 B2 * | 12/2012 | Ribeiro | | 29/888.042 |
| 2007/0022875 A1 * | 2/2007 | Kim | | 92/172 |
| 2008/0098885 A1 * | 5/2008 | Hall | | 92/172 |
| 2008/0289328 A1 * | 11/2008 | Sollie et al. | | 60/520 |

* cited by examiner

*Primary Examiner* — Nathaniel Wiehe
*Assistant Examiner* — Dustin T Nguyen
(74) *Attorney, Agent, or Firm* — Cantor Colburn LLP

(57) ABSTRACT

A piston includes an outer shell having a receptacle at one end and a link retainer. The link retainer is configured to be positioned within the receptacle and affixed to the outer shell. The link retainer and the outer shell each define an opposing wall of a sealing ring groove, and one of the link retainer and the outer shell has an outer surface defining a base of the sealing ring groove.

20 Claims, 3 Drawing Sheets

MULTI-PART PISTON

BACKGROUND OF THE INVENTION

Embodiments of the present disclosure relate to a multi-part piston, and in particular to a piston having an outer shell and an inner link retainer, where a joint of the outer shell and the link retainer define a groove for a sealing ring.

Pneumatic pistons with seal rings are used in many designs. Typical pistons have seal ring wear issues, since a cross-sectional thickness of the seal ring is limited by an installation process. Typically, the seal ring must be expanded, such as by bending the seal ring, to fit around an outer circumference of the piston to position the seal ring in a groove. The degree of bending required may limit the thickness of the seal ring, which in turn may result in a degraded performance of the piston due to seal ring wear.

BRIEF DESCRIPTION OF THE INVENTION

Embodiments of the present disclosure relate to a piston including an outer shell having a receptacle at one end and a link retainer. The link retainer is configured to be positioned within the receptacle and affixed to the outer shell. The link retainer and the outer shell each define an opposing wall of a sealing ring groove, and one of the link retainer and the outer shell has an outer surface defining a base of the sealing ring groove.

Embodiments of the present disclosure further relate to a piston including an outer shell having a cylindrical portion defining a cavity at one end and a link retainer having a radially narrow portion positioned within the cavity. An outer surface of the radially narrow portion contacts an inside surface of the outer shell, and the link retainer has a radially wide portion contacting an end of the outer shell. Each of the link retainer and the outer shell has a radially extending protrusion defining opposing walls of a sealing ring groove.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Figure 1:
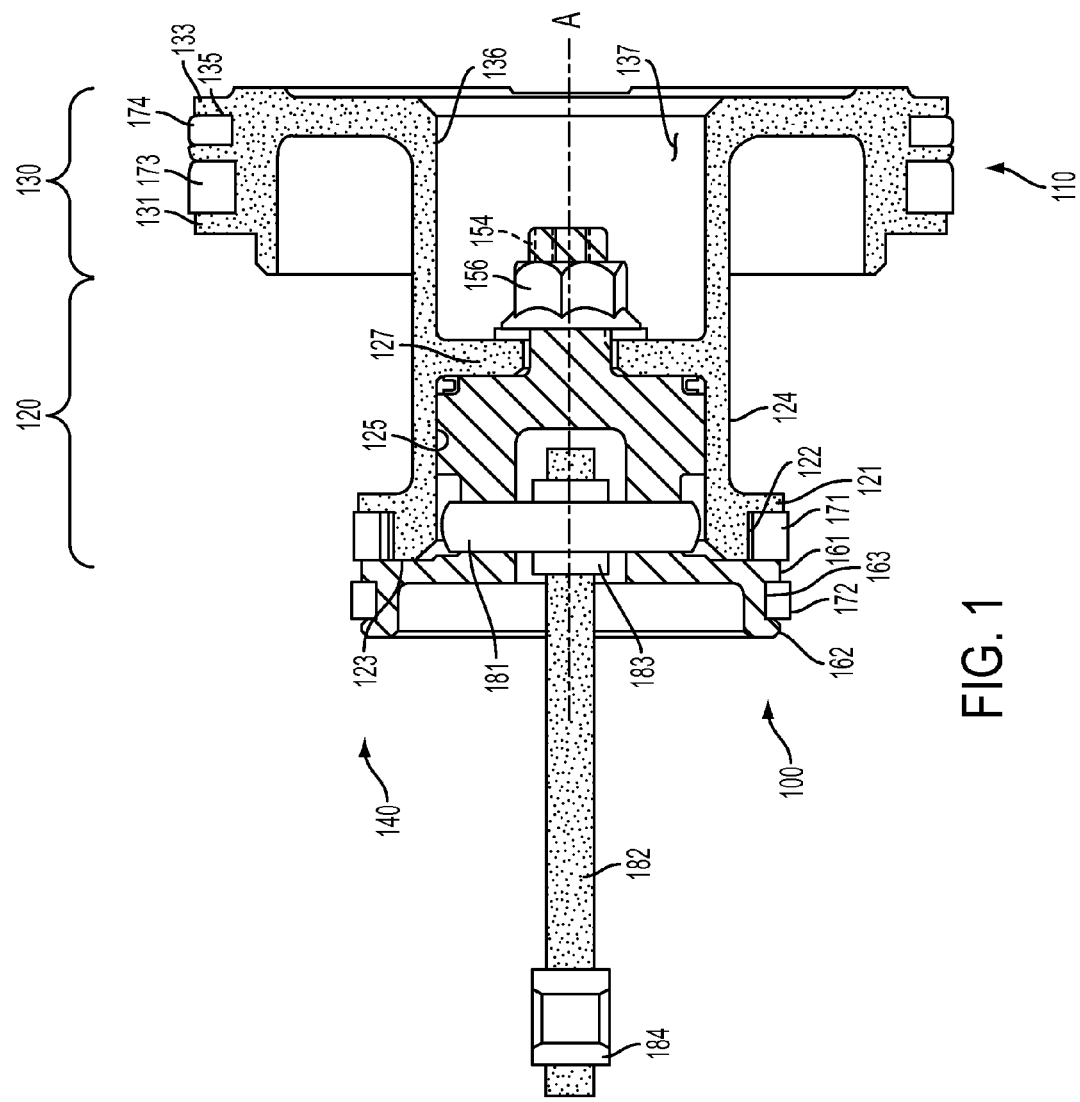
FIG. 1 is a cross-sectional view of a piston according to an embodiment of the present disclosure.
Figure 2:
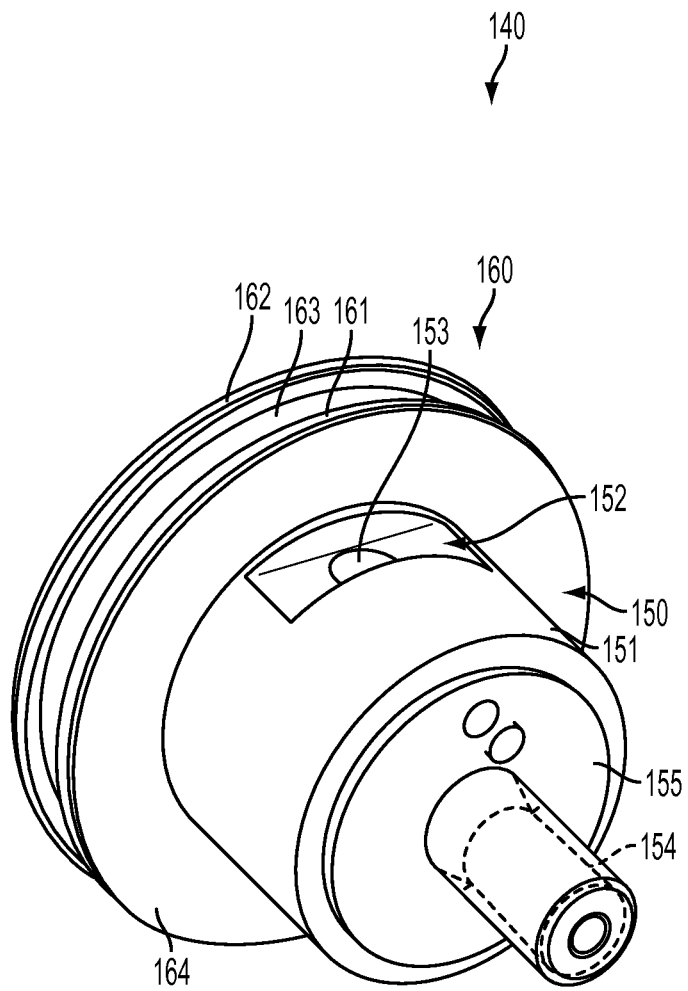
FIG. 2 is a perspective view of a link retainer according to an embodiment of the present disclosure.
Figure 3:
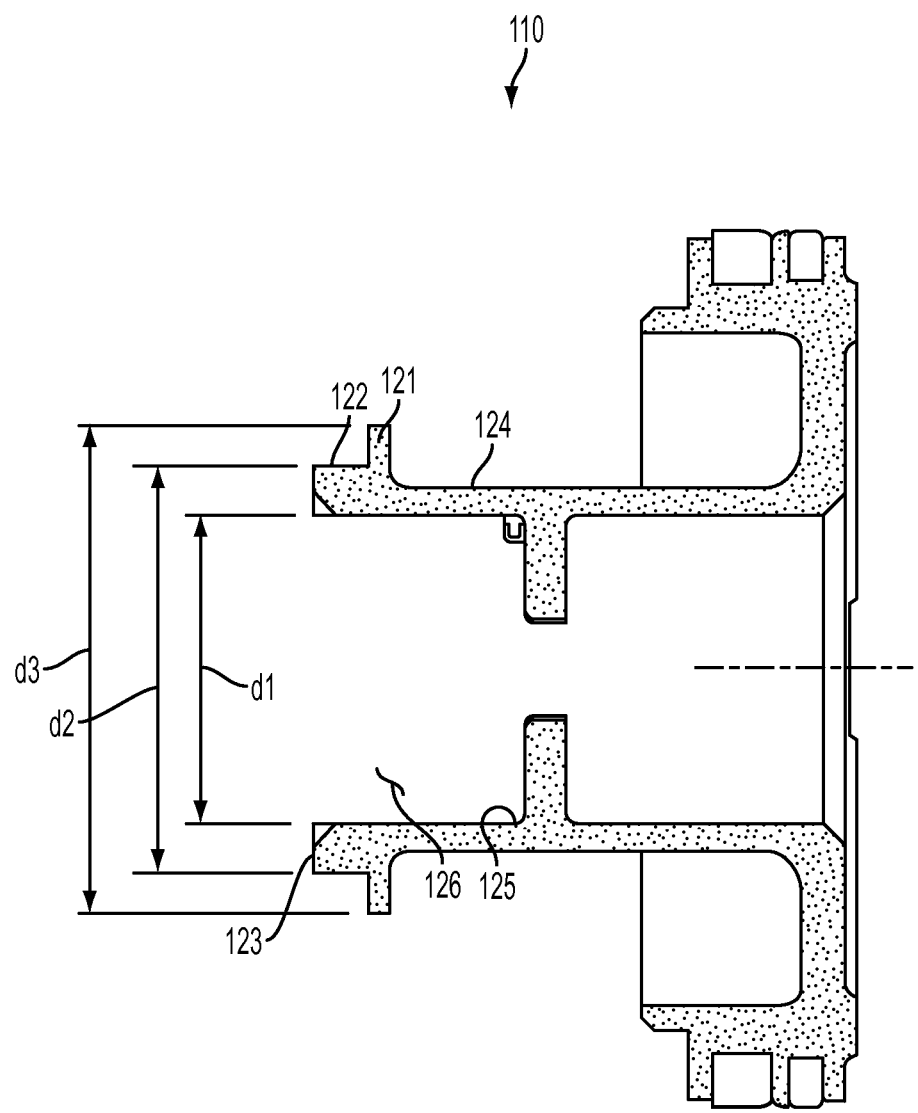
FIG. 3 is a cross-sectional view of an outer shell of a piston according to one embodiment.

A detailed description of one or more embodiments of the disclosed apparatus is presented herein by way of example and not limitation with reference to FIGS. 1 to 3.

FIG. 1 illustrates a piston 100 comprising an outer shell 110 and a link retainer 140. The outer shell 110 includes a radially-narrow portion 120 and a radially-wide portion 130. The radially-narrow portion 120 includes a radially-extending protrusion 121 (also referred to as a lip 121 or a ridge 121), a rim 123 (also referred to as an axially-facing surface 123), and an outer surface segment 122 (which may form a base of a groove) between the radially-extending protrusion 121 and the rim 123. In the present specification and claims, the line A of FIG. 1 defines an axial direction, and rays extending from the line A perpendicular to the line A define radial directions. The link retainer 140 is located immediately adjacent to the rim 123. Referring to FIGS. 1 to 3, the link retainer 140 includes a radially narrow portion 150 and a radially wide portion 160. The radially narrow portion 150 of the link retainer 140 is configured to fit within a receptacle 126 (also referred to as cavity 126) defined by the narrow portion 120 of the outer shell 110. In particular, the narrow portion 150 of the link retainer 140 is configured to fit snugly within the receptacle 126 such that an outer surface 151 of the narrow portion 150 contacts in inner surface 125 of the narrow portion 120 of the outer shell 110 around a circumference of the outer surface 151 of the narrow portion 150 of the link retainer 140.

The link retainer 140 is configured such that when the narrow portion 150 is positioned within the receptacle 126, an axially-facing surface 164 of the wide portion 160 of the link retainer 140 is adjacent to the opposing axially-facing surface 123 of the outer shell 110. The wide portion 160 of the link retainer 140 includes a radially-extending protrusion 161 (also referred to as lip 161 or ridge 161). The axially facing surface 164 of the link retainer 140 forms one wall of a sealing ring groove, the radially-extending protrusion 121 of the radially-narrow portion 120 of the outer shell 110 forms an opposing wall of the sealing ring groove, and the outer surface segment 122 of the radially-narrow portion 120 forms a base of the sealing ring groove.

Although FIGS. 1 to 3 illustrate an embodiment in which an outer surface segment 122 of the outer shell 110 comprises the base of the sealing ring groove, embodiments of the present disclosure encompass any configuration in which the outer shell 110 defines one wall of the groove and the link retainer 140 defines an opposing wall of the groove. For example, in one embodiment, an outer surface of the link retainer 140 forms a base of the groove and is located adjacent to the radially extending projection 121 of the outer shell 110. In another embodiment, the sealing ring groove may be formed as an indentation in one of the link retainer 140 and the outer shell 110, rather than by radially-extending ridges extending outward from a surface, such as the outer surface 124 of the narrow portion 120 of the outer shell 110.

Referring to FIG. 1, the link retainer 140 further includes a radially-extending protrusion 162 (also referred to as lip 162). The lips 161 and 162 are separated by an outer surface segment 163 (also referred to as base 163), the lips 161 and 162 define walls of a groove, and the segment 163 defines a base of the groove. The groove defined by the lips 161 and 162 and the base 163 may be configured to receive a positioning ring 172, such as a rider ring 172. The groove defined by the lips 161 and 162 and the outer surface segment 122 may be configured to receive a sealing ring 171, such as a piston ring. In embodiments of the present disclosure, the rider ring 172 may be configured to maintain a radial position of the piston 100 within a cylinder, and the sealing ring 171 may be configured to form a pressure seal within the cylinder.

The sealing ring 171 may have a thickness greater than the rider ring 172. In addition, since the base, outer surface segment 122, of the sealing ring groove is exposed prior to attaching the link retainer 140 to the outer shell 110, the sealing ring 171 may be installed around the base without bending the sealing ring 171. Accordingly, the sealing ring 171 may be configured to have an increased thickness relative to a piston in which the sealing ring groove is formed entirely by an outer surface of one of the outer shell 110 or the link retainer 140. The increased thickness of the sealing ring 171 may result in improve wear characteristics.

In one embodiment, the increased radial thickness of the sealing ring 171 is defined by an increased depth of the sealing ring groove defined by the lips 164 and 121 and the base, i.e., outer surface segment 122. In one embodiment, a ratio of a diameter d1 of the receptacle 126 and a diameter d2 of the base of the groove is between about 1:1.2 to 1:1.4. For example, in one embodiment, the ratio of d1 to d2 is about 1:1.33. In one embodiment, a ratio of the diameter d2 of the base to the diameter d3 of the outer edge of the lip 121 is between about 1:1.15 to 1:1.23. For example, in one embodiment the ratio of the diameter d2 to the diameter d3 is about 1:1.19. In embodiments of the present disclosure, the sealing ring 171 and the rider ring 172 may be formed of any material, such as plastics, polytetrafluoroethylene such as, for example, Teflon™, metal or any other similar types of non-metallic, stiff material.

Referring to FIG. 2 the link retainer 140 includes a hole 153 (i.e., a through-aperture that traverses the surface 151) configured to receive a hinge pin 181. In one embodiment, the hole 153 is located axially apart from the lip 161. For example, the hole 153 may be located in the radially-narrow portion 150 of the link retainer 140. A groove 152 may be formed in the outer surface 151 of the radially-narrow portion 150 and the hole 153 may be formed in the groove 152. With further reference to FIGS. 1 and 3, the link retainer 140 may include a bolt portion 154 configured to extend through a hole of an annular disk 127 in the outer shell 110 when the radially-narrow portion 150 of the link retainer 140 is positioned within the receptacle 126, such that an axially-facing surface 155 of the link retainer 140 contacts the annular disk 127. A nut 156 may affix the link retainer 140 to the outer shell 110. The bolt portion 154 may extend through the annular disk 127 into a cavity 137 defined by an inner surface 136 of the outer shell 110. Although one method of affixing the link retainer 140 to the outer shell 110 has been illustrated, embodiments of the present disclosure encompass any method of affixing the retainer 140 to the outer shell 110 including a nut and bolt, screws, adhesives, welds or any other affixing methods.

A connector link 182 may be connected to the hinge pin 181 via a hole in the connector link 182 and a bushing 183. Another hole and bushing 184 located at an opposite end of the connector link 182 may be connected to a device that may be driven by the piston 100.

The outer shell 110 may further include, at the radially wide portion 130, radially-extending protrusions 131, 132 and 133. The radially-extending protrusions 131 and 132 may be separated by a base 134 to define a groove, and a piston ring 173 may be positioned within the groove. The piston ring 173 around the radially wide portion 130 may have a larger inner and outer diameter than the sealing ring 171 around the narrow portion 120. The radially-extending protrusions 132 and 133 may be separated by a base 135 to define another groove, and a rider ring 174 may be positioned in the groove formed by the radially-extending protrusions 132 and 133.

According to embodiments of the present disclosure, a link retainer defines one wall of a groove and an outer shell of a piston defines an opposing wall of the groove. A sealing ring, such as a piston ring may be slid onto a base of the groove, which may correspond to an outer circumferential surface of either the link retainer or the outer shell of the piston. The link retainer may then be affixed to the outer shell of the piston. Accordingly, since the sealing ring is attached to the piston prior to attaching the link retainer to the outer shell of the piston, a radial thickness of the sealing ring may be increased relative to a configuration in which the sealing ring must be bent or expanded to be positioned within a groove. As a result of the increased radial thickness of the sealing ring, wear characteristics of the sealing ring may be improved.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A piston, comprising:
   an outer shell having a receptacle at one end and a cavity at another end thereof with an annular disk separating the receptacle and the cavity, the outer shell defining an axis therethrough; and
   a link retainer configured to be positioned within the receptacle and affixed to the outer shell, the link retainer having a first axially facing surface configured to contact the annular disk, and a portion of the link retainer extends through an aperture of the annular disk into the cavity;
   the link retainer and the outer shell each defining an opposing wall of a sealing ring groove, and one of the link retainer and the outer shell having an outer surface defining a base of the sealing ring groove,
   wherein the link retainer comprises a first radially-extending lip and a second radially-extending lip, the first and second radially-extending lips defining a circumferential groove between the first and second radially-extending lips, and the first radially-extending lip configured to be positioned adjacent to the outer shell to form a wall of the sealing ring groove.

2. The piston of claim 1, wherein the link retainer comprises a radially narrow portion configured to be positioned within the receptacle and a radially wide portion having a second axially-facing surface configured to contact an axially-facing surface of the outer shell.

3. The piston of claim 1, wherein the link retainer includes a radially-extending protrusion configured to contact a rim of the outer shell to form a first wall of the sealing ring groove, the outer shell includes a radially-extending protrusion spaced apart from the rim to define a second wall of the sealing ring groove, and an outer surface of the outer shell between the rim and the second wall defines a base of the sealing ring groove.

4. The piston of claim 3, wherein the link retainer includes a pin bore hole configured to receive a hinge pin, the hinge bore hole being axially separated from the radially-extending lip of the link retainer.

5. The piston of claim 1, further comprising:
   a sealing ring located circumferentially around an outer surface of the outer shell, a first end of the sealing ring contacting the outer shell and a second end of the sealing ring opposite the first end contacting the link retainer.

6. The piston of claim 5, further comprising:
   a rider ring located circumferentially around an outer surface of the link retainer.

7. The piston of claim 1, wherein the outer shell includes a radially narrow portion including the receptacle and a radially-wide portion at an opposite end of the outer shell than the link retainer, the radially-wide portion of the outer shell including at least one of a sealing ring groove and a rider ring groove located around an outer circumference of the radially-wide portion.

8. The piston of claim 1, wherein a ratio of a diameter of an inside surface of the outer shell defining the receptacle to a diameter of the base is between about 1:1.2 to 1:1.4.

9. The piston of claim 1, wherein a ratio of a diameter of the base to a diameter of a wall of the sealing ring groove defined by the link retainer is between about 1:1.15 to 1:1.23.

10. A piston, comprising:
   an outer shell having a cylindrical portion defining a receptacle at a first end and a cavity at a second end, the receptacle and the cavity separated by an annular disk and defining an axis therethrough; and
   a link retainer having a radially narrow portion positioned within the receptacle such that an outer surface of the radially narrow portion contacts an inside surface of the outer shell, the link retainer having a radially wide portion contacting an end of the outer shell, and the radially narrow portion having a first axially facing surface configured to contact the annular disk, and a portion of the link retainer extends through an aperture of the annular disk into the cavity;
   wherein each of the link retainer and the outer shell having a radially extending protrusion defining opposing walls of a sealing ring groove,
   wherein an outer surface of the outer shell between the radially extending protrusions of the link retainer and the outer shell defines a base of the sealing ring groove.

11. The piston of claim 10, wherein the radially extending protrusions of the link retainer and the outer shell extend circumferentially around the link retainer and the outer shell, respectively.

12. The piston of claim 10, wherein a second axially-facing surface of the radially wide portion of the link retainer abuts a rim of the outer shell.

13. The piston of claim 10, wherein the radially extending protrusion of the link retainer further defines a wall of a rider ring groove in the link retainer.

14. The piston of claim 10, wherein the link retainer includes a bore hole separated from the radially extending protrusion of the link retainer in an axial direction, the piston further comprising:
   a hinge pin located within the borehole; and
   a connector link having a hole through which the hinge pin passes to link the connector link to the link retainer.

15. A piston, comprising:
   an outer shell having a receptacle at one end and a cavity at another end thereof with an annular disk separating the receptacle and the cavity, the outer shell defining an axis therethrough;
   a link retainer configured to be positioned within the receptacle and affixed to the outer shell, the link retainer having a first axially facing surface configured to contact the annular disk, and a portion of the link retainer extends through an aperture of the annular disk into the cavity;
   the link retainer and the outer shell each defining an opposing wall of a sealing ring groove, and one of the link retainer and the outer shell having an outer surface defining a base of the sealing ring groove,
   wherein the link retainer includes a radially-extending protrusion configured to contact a rim of the outer shell to form a first wall of the sealing ring groove, the outer shell includes a radially-extending protrusion spaced apart from the rim to define a second wall of the sealing ring groove, and an outer surface of the outer shell between the rim and the second wall defines a base of the sealing ring groove.

16. The piston of claim 15, wherein the link retainer comprises a radially narrow portion configured to be positioned within the receptacle and a radially wide portion having a second axially-facing surface configured to contact an axially-facing surface of the outer shell.

17. The piston of claim 15, further comprising:
   a sealing ring located circumferentially around an outer surface of the outer shell, a first end of the sealing ring contacting the outer shell and a second end of the sealing ring opposite the first end contacting the link retainer.

18. The piston of claim 17, further comprising:
   a rider ring located circumferentially around an outer surface of the link retainer.

19. The piston of claim 15, wherein the link retainer includes a pin bore hole configured to receive a hinge pin, the hinge bore hole being axially separated from the radially-extending lip of the link retainer.

20. The piston of claim 15, wherein the link retainer comprises a first radially-extending lip and a second radially-extending lip, the first and second radially-extending lips defining a circumferential groove between the first and second radially-extending lips, and the first radially-extending lip configured to be positioned adjacent to the outer shell to form a wall of the sealing ring groove.

* * * * *